United States Patent [19]
Miller et al.

[11] Patent Number: 4,730,836
[45] Date of Patent: Mar. 15, 1988

[54] GASKET ALIGNMENT INSERT

[75] Inventors: Paul H. Miller, Wheaton; Brian F. Rericha, Downers Grove; Paul J. Stoeck, Northlake, all of Ill.

[73] Assignee: Microdot Inc., Darien, Conn.

[21] Appl. No.: 34,998

[22] Filed: Apr. 6, 1987

[51] Int. Cl.⁴ .................. F16J 15/06; F16B 2/04; F02F 7/00; F02F 11/00
[52] U.S. Cl. .................. 277/235 B; 277/199; 277/233; 411/508; 411/525; 123/198 E
[58] Field of Search ........... 277/192, 193, 199, 235 R, 277/235 B, 233, 234; 123/198 E; 411/508–510, 525

[56] References Cited

U.S. PATENT DOCUMENTS

| | | | |
|---|---|---|---|
| 3,449,799 | 6/1969 | Bien | 411/510 X |
| 4,118,041 | 10/1978 | Futamura | 277/235 B X |
| 4,186,930 | 2/1980 | Shulke | 277/199 X |
| 4,497,516 | 2/1985 | Morita et al. | 411/508 X |
| 4,524,979 | 6/1985 | Bauder | 277/235 B X |

FOREIGN PATENT DOCUMENTS

| | | | |
|---|---|---|---|
| 3321425 | 12/1984 | Fed. Rep. of Germany | 277/235 B |
| 59-215943 | 12/1984 | Japan | 277/235 B |
| 745788 | 2/1956 | United Kingdom | 411/508 |

*Primary Examiner*—Robert S. Ward
*Attorney, Agent, or Firm*—Lyman R. Lyon

[57] ABSTRACT

An insert which ensures contiguity and proper alignment during installation of a plurality of gasket elements used to seal the joint between the mating surfaces of components comprising an internal combustion engine.

11 Claims, 5 Drawing Figures

U.S. Patent
Mar. 15, 1988
4,730,836
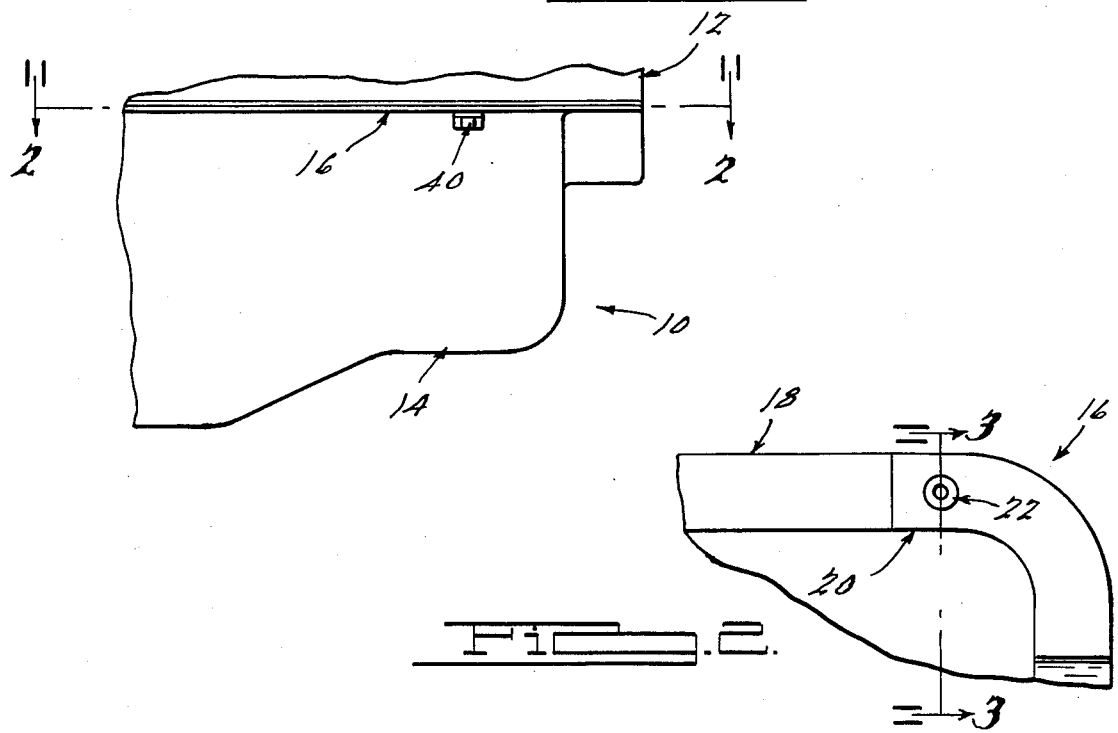
Fig. 1.
Fig. 2.
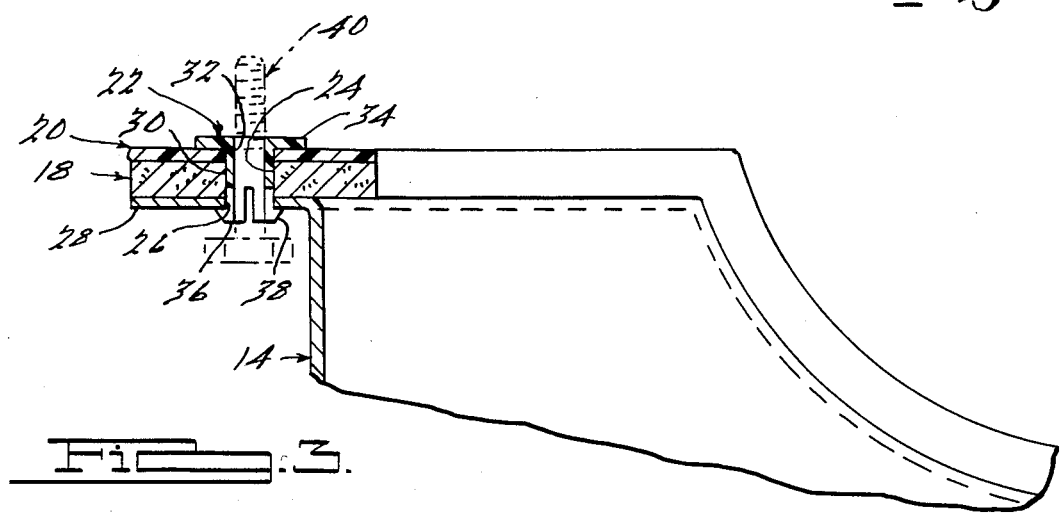
Fig. 3.
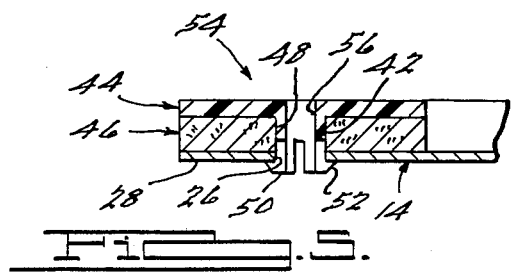
Fig. 5.
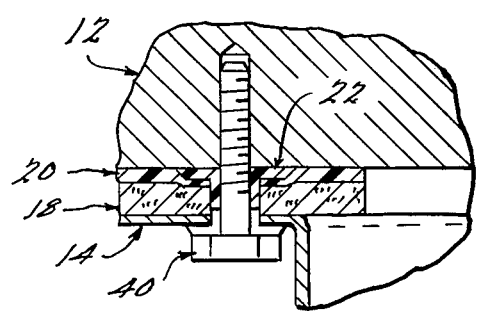
Fig. 4.

GASKET ALIGNMENT INSERT

BACKGROUND OF THE INVENTION

The invention relates to gaskets used to seal the mating surfaces of parts comprising an internal combustion engine.

The prior art teaches the use of a plurality of sealing elements, characteristically formed of elastomers, cork or rubber, to seal the gap between engine components where the large mating surface therebetween makes it impossible or uneconomical to cut a gasket therefor from a single sheet of gasket material. It is difficult, however, to maintain proper alignment of a multiplicity of sealing elements during assembly of the engine components. Moreover, the individual elements typically move from their properly aligned positions while the engine component surfaces to be conjugally secured are forcibly clamped together as by the tightening of threaded fasteners. Leak paths between adjacent sealing elements are likely to be created by such misalignment, thereby rendering the seal ineffective.

The prior art also teaches the use of a gasket comprised of a single custom-molded elastomeric sealing element. The leak path problem is thus avoided. The onepiece gasket may additionally employ internal stiffening means, such as incorporating a metal sheet therein, to prevent lateral displacement of the gasket upon clamping of engine components. However, as the one-piece seal is custom molded for each application, it is much more costly than its multiple element counterpart. Further, the one-piece seal remains subject to leaking where improperly aligned during installation.

SUMMARY OF THE INVENTION

The insert of the instant invention allows for the pre-assembly and accurate installation of an internal combustion engine gasket comprising a plurality of sealing elements. The invention additionally prevents misalignment of the gasket during engine assembly.

The invention comprises the use of overlapping sealing elements in conjunction with a plurality of plastic or metal inserts to secure the relative positions of adjacent sealing elements with respect to the mating engine surfaces during installation and assembly thereof. The sealing elements are held in contiguous formation as an assembly by the inserts prior to installation of the gasket assembly between the opposing surfaces of the mating engine parts. The inserts additionally secure the gasket assembly to one of the mating engine component surfaces prior to assembly of the engine coponents. The individual sealing elements are therefore no longer free to move from proper alignment during either alignment or the clamping together of the mating engine components.

It is to be noted that during the original assembly of an automotive internal combustion engine, the oil pan is assembled with the engine block in an inverted manner, with the oil pan being lowered from above to its final position on the engine block. It is therefore necessary to secure the oil pan gasket assembly to the oil pan prior to its inversion. Moreover, the gasket assembly must be sufficiently immotile so as to prevent misalignment upon engine assembly. The insert of the instant invention provides such gasket stability.

BRIEF DESCRIPTION OF THE DRAWINGS

FIG. 1 is a partial side view in elevation of an engine block and an oil pan separated by a gasket assembly constructed in accordance with the instant invention.

FIG. 2 is a partial top view of the gasket assembly and the oil pan taken along the line 2—2 of FIG. 1.

FIG. 3 is a sectional view of the gasket assembly and the oil pan taken along the line 3—3 of FIG. 2

FIG. 4 is a partial section similar to that of FIG. 3 of the final assembly comprising the engine block, the oil pan, the insert of the instant invention, a machine bolt, and side and end sealing elements.

FIG. 5 is a partial section similar to that of FIG. 3 of an alternate embodiment of the invention.

DETAILED DESCRIPTION OF THE PREFERRED EMBODIMENT OF THE INVENTION

FIG. 1 shows a portion of an internal combustion engine 10 comprising an engine block 12, an oil pan 14, and a gasket assembly 16 located therebetween. A top view of a portion of the gasket assembly 16 is shown in FIG. 2 as comprising an elastic side sealing element 18, an elastic end sealing element 20, and a plastic or metal insert 22 constructed in accordance with the instant invention. A metal insert (not shown) may be incorporated within sealing elements 18 and 20 to increase gasket rigidity. Sealing elements 18 and 20 are provided with ends of reduced thickness so as to maintain constant nominal thickness of the gasket assembly 16 upon overlapping with one another, as shown in FIG. 3. The overlapping portion of sealing elements 18 and 20 is provided with a circular aperture 24 extending therethrough and aligned with the circular aperture 26 located in the flange 28 of the oil pan 14 when the gasket assembly 16 is itself properly aligned with the oil pan 14.

The insert 22 of the instant invention comprises a cylindrical body portion 30 having a central aperture 32 extending longitudinally therethrough and a radially outwardly extending flange 34 on one end thereof. The opposite end is provided with a plurality of longitudinally extending slots to define an equal number of longitudinally extending segments 36. The segments 36 are additionally provided with radially outwardly extending barbs 38, as shown in FIG. 3. The insert 22 is intromitted through apertures 24 and 26, thereby acting to align the gasket assembly 16 with the oil pan 14. During insertion therethrough, the segments 36 of the insert 22 are elastically deflected radially inward. The barbs 38 are sufficiently removed longitudinally from the flange 34 so as to protrude from the underside of the oil pan flange 28 and thereby effect locking of the gasket assembly 16 thereto by resilient radially outward movement of the segments 36. A machine bolt 40 is then advanced through the central longitudinal aperture 32 of the insert 22 during the assembly of the oil pan 14 to the engine block 12. The barbs 38 plastically deform upon tightening of the oil pan bolt 40, thereby forming a surface upon which to seat the head of the bolt 40, as shown in FIG. 4.

An alternate embodiment of the instant invention is shown in FIG. 5 comprising a similar fastener arrangement wherein the insert 22 is replaced by a similarly shaped cylindrical projection 42 molded into the overlapping portion of one of the sealing elements 44, so as to be inserted into the circular aperture 48 formed in the end of the sealing element 46 with which it is to be conjugally secured. The free end of the cylindrical projection 42 is formed with a plurality of slots extending longitudinally therein to define an equal number of longitudinally extending segments 50, each of which is provided with a radially outwardly extending barb 52. As with the insert 22 above, the barbs 52 are located on the segments 50 so as to lock the gasket assembly 54 comprised of sealing elements 44 and 46 to the flange 28 of the oil pan 14. The cylindrical projection 42 is provided with a longitudinally extending circular aperture 56 to accept insertion of an oil pan bolt 40 therethrough.

The central longitudinal aperture of the insrt 22 or cylindrical projection 42 may be formed so as to expand the longitudinally extending segments 36 and 50 thereof radially outwardly upon advancement therethrough of oil pan bolt 50. The gasket assembly 16 or 54 is thereby locked to the oil pan flange 28 by interference fit subsequent to alignment therewith by insertion of the insert 22 or cylindrical projection 42 through the circular aperture 26 in the oil pan flange 28. The insert 22 of the instant invention may additionally employ an outer surface having a longitudinally extending radially inwardly tapering portion, thereby allowing the insert 22 to be wedged into the aligned apertures 24 and 26 in order to securely join sealing elements 18 and 20. Similarly, the cylindrical projection 42 may employ an outer surface having a longitudinally extending radially inward taper, thereby allowing the cylindrical projection 42 to be wedged into the aligned apertures 48 and 26 in order to securely join sealing elements 44 and 46.

It is to be noted that, while the suitability of the insert of the instant invention for use in comprising a multiple element oil pan gasket assembly has been described hereinabove, the insert is suitable for application wherever fluid retention is required in an internal combustion engine. Thus, the insert of the instant invention is suitable for use in sealing, for example, the rocker cam cover of such an engine.

While the preferred embodiment of the invention has been disclosed, it should be appreciated that the invention is susceptible of modification without departing from the spirit of the invention or the scope of the subjoined claims.

I claim:

1. A gasket assembly for retention of fluid in an internal combustion engine comprising
   a plurality of gasket elements having ends of reduced thickness which overlap with one another to form a continuous gasket, each of said overlapping ends having a circular aperture formed therein, and
   a cylindrical insert having a central longitudinal circular aperture and a radially outwardly projecting flange on one end, said insert being inserted through the apertures formed in the ends of said gasket elements, whereby said elements are joined.

2. The gasket assembly of claim 1 wherein the end of said insert opposite the flange has a radially outward surface having a longitudinaly extending radially inwardly tapering portion.

3. The gasket assembly of claim 1 wherein the end of said insert opposite the flange has a plurality of longitudinally extending slots defining an equal number of longitudinally extending segments, said segments to elastically deflect radially inwardly during insertion through the aligned apertures of said gasket elements, the resiliency of said deflected segments preventing disassembly of said gasket elements subsequent to such insertion.

4. The gasket assembly of claim 1 including an insert having the end opposite the flange formed with a plurality of longitudinally extending slots defining an equal number of longitudinally extending segments, the end of each of said segments being provided with a radially outwardly projecting barb, said segments to elastically deflect radially inwardly during insertion through the aligned apertures of said gasket elements, said barbs preventing disassembly of said gasket elements subsequent to such insertion.

5. The gasket assembly of claim 1 wherein the end of said insert opposite the flange has a plurality of longitudinally extending slots defining an equal number of longitudinally extending segments, said segments to be inserted through the aligned apertures of said gasket elements, said segments to be deflected radially outwardly by advancement of a male fastener element through the central longitudinal aperture of said insert, whereby disassembly of said gasket elements subsequent to such insertion is prevented.

6. The gasket of claim 5 wherein each of said longitudinally extending segments is provided with a radially outwardly extending barb.

7. A gasket assembly for retention of fluid in an internal combustion engine comprising a plurality of gasket elements having ends of reduced thickness which overlap with one another to form a continuous gasket, each pair of said overlapping ends comprising a first end having a cylindrical projection extending normal to the plane of said element and having a central longitudinal aperture formed therein to accept advancement of a fastener element therethrough, and a second end having a circular aperture formed therein, whereby said pair of overlapping ends are conjugally secured by insertion of said cylindrical projection of said first end through the circular aperture of said second end.

8. The gasket assembly of claim 7 wherein the radially outward surface of said cylindrical projection has a longitudinally extending radially inwardly tapering portion.

9. The gasket assembly of claim 7 wherein said cylindrical projection of said first end has a plurality of longitudinally extending slots defining an equal number of longitudinally extending segments, said segments to elastically deflect radially inwardly during insertion through circular aperture of said second end, the resiliency of said deflected segments preventing disassembly of said pair of overlapping ends subsequent to such insertion.

10. The gasket assembly of claim 7 wherein said cylindrical projection of said first end has a plurality of longitudinally extending slots defining an equal number of longitudinally extending segments, each of said segments having a radially outwardly extending barb, said segments to elastically deflect radially inwardly during insertion through the circular aperture of said second end, said barbs preventing disassembly of said gasket elements subsequent to such insertion.

11. The gasket assembly of claim 7 wherein said cylindrical projection of said first end has a plurality of longitudinally extending slots defining an equal number of longitudinally extending segments, said segments of said cylindrical projection to be inserted through the circular aperture of said second end, each of said segments to be deflected radially outwardly by advancement of a male fastener element through the central longitudinal aperture of said cylindrical projection, whereby disassembly of said gasket elements subsequent to such insertion is prevented.

* * * * *